(12) United States Patent
Bowers et al.

(10) Patent No.: US 12,300,076 B1
(45) Date of Patent: May 13, 2025

(54) SYSTEMS AND METHODS FOR AUTHENTICATING A USER IDENTITY USING A SOUND DEVICE

(71) Applicant: Capital One Services, LLC, McLean, VA (US)

(72) Inventors: Justin Bowers, Richmond, VA (US); Karthik Nagesh, Arlington, VA (US); Christopher Matthews, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 21 days.

(21) Appl. No.: 18/499,606

(22) Filed: Nov. 1, 2023

(51) Int. Cl.
*G07F 7/12* (2006.01)
*G06F 21/31* (2013.01)
*G07F 7/08* (2006.01)

(52) U.S. Cl.
CPC .............. *G07F 7/12* (2013.01); *G06F 21/31* (2013.01); *G07F 7/0806* (2013.01)

(58) Field of Classification Search
CPC .................................. G07F 7/12; G06F 21/31
USPC ......................................................... 235/380
See application file for complete search history.

(56) References Cited

U.S. PATENT DOCUMENTS

| | | | |
|---|---|---|---|
| 6,266,430 B1 | 7/2001 | Rhoads | |
| 8,051,294 B2 | 11/2011 | Rhoads | |
| 9,584,356 B2 * | 2/2017 | Gressus | H04L 63/18 |
| 10,469,489 B2 | 11/2019 | Kao | |
| 10,540,979 B2 | 1/2020 | Visser et al. | |
| 2003/0115472 A1 * | 6/2003 | Chang | G06F 21/80 |
| | | | 713/182 |
| 2014/0154969 A1 * | 6/2014 | Atsmon | G06Q 20/40975 |
| | | | 455/3.06 |
| 2014/0259838 A1 * | 9/2014 | Tattersall | B32B 27/08 |
| | | | 428/81 |
| 2015/0036894 A1 * | 2/2015 | Matsunami | G06V 10/449 |
| | | | 382/115 |
| 2019/0362336 A1 * | 11/2019 | Yim | G06Q 20/353 |
| 2024/0193583 A1 * | 6/2024 | Kim | B42D 25/324 |

* cited by examiner

*Primary Examiner* — Allyson N Trail
(74) *Attorney, Agent, or Firm* — Bookoff McAndrews, PLLC (57) ABSTRACT

Systems and methods for authenticating a user identity using a sound device, the sound device comprising a card including a plurality of texture protrusions, including establishing an audio connection between a user device and an authentication system, instructing a user of the user device to generate real-time sound data, receiving the real-time sound data at the authentication system, comparing the real-time sound data to a pre-determined sound configuration to determine a match value, and upon determining the match value, causing to output a notification of the determined match value.

20 Claims, 9 Drawing Sheets

SYSTEMS AND METHODS FOR AUTHENTICATING A USER IDENTITY USING A SOUND DEVICE

TECHNICAL FIELD

Various embodiments of this disclosure relate generally to authenticating a user identity using a sound device and, more particularly, to systems and methods for determining a sound match between real-time sound data and a pre-determined sound configuration.

BACKGROUND

Conventional methods of identity authentication typically involve authentication based on interacting with a device, an application, and/or a system that often require access to the internet and/or cellular service. For example, multi-factor authentication often requires one or both of access to the internet and/or cell service. However, under certain conditions, e.g., when a person seeking to authenticate their identity is in an environment with low technological capabilities, authentication systems, such as multi-factor authentication, may not be functional. Without a secure way to authenticate across environments, users may be at heightened risk of identity theft, illegitimate identity authorization(s), etc.

This disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for authenticating a user identity using a sound device.

In one aspect, a method for authenticating a user identity using a sound device, the sound device comprising a card including a plurality of texture areas, is disclosed. The method may include: establishing an audio connection between a user device and an authentication system; instructing a user of the user device to generate real-time sound data, wherein the real-time sound data is generated by the sound device contacting a sound activating device; receiving, via the user device, the real-time sound data at the authentication system; comparing, via the authentication system, the real-time sound data to a pre-determined sound configuration to determine a match value, wherein the match value is one of match or no match; and upon determining the match value, causing to output a notification of the determined match value.

In another aspect, a system is disclosed. The system may include: at least one memory storing instructions, and at least one processor executing the instructions to perform operations for authenticating a user identity using a sound device, the sound device comprising a card including a plurality of texture protrusions. The operations may include: establishing an audio connection between a user device and an authentication system; instructing a user of the user device to generate real-time sound data, wherein the real-time sound data is generated by the sound device contacting a sound activating device; receiving, via the user device, the real-time sound data at the authentication system; comparing, via the authentication system, the real-time sound data to a pre-determined sound configuration to determine a match value, wherein the match value is one of match or no match; and upon determining the match value, causing to output, a notification of the determined match value.

In another aspect, a method for authenticating a user identity using a sound device, the sound device comprising a card including a plurality of texture protrusions, is disclosed. The method may include: receiving, via an authentication system, initial authentication data of a user, the initial authentication data including user-specific knowledge data; comparing, via one or more processors, the user-specific knowledge data to one or more comparison values to determine a user-specific knowledge match; upon determining the user-specific knowledge match between the user-specific knowledge data and the one or more comparison values, establishing an audio connection between a user device and the authentication system; instructing a user of the user device to generate real-time sound data, wherein the real-time sound data is generated by the sound device contacting a sound activating device; receiving, via the user device, the real-time sound data at the authentication system; comparing, via the authentication system, the real-time sound data to a pre-determined sound configuration to determine a match value, wherein the match value is one of match or no match; and upon determining the match value, causing to output, a notification of the determined match value.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Reference to any particular activity is provided in this disclosure only for convenience and not intended to limit the disclosure. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

In an exemplary use case, a user may conduct identity authentication, e.g., in an environment with low technological capabilities. For example, the user may be in a militarized zone where network connections may be unstable or unavailable. As such, conventional authentication methods, e.g., one-time-password (OTP) authentication, biometric authentication, etc., may be less accessible. The user wishing to be authenticated (hereinafter "user") may use a phone, e.g., a payphone, to call an authentication service. The authentication service may connect the user-via an audio connection associated with the phone-to one or both of an authentication system or a user associated with the authentication system.

The user may provide user-specific knowledge in response to one or more authentication questions as a first authentication method. If the first authentication method is successful, the user may be instructed, e.g., by the authentication system, the authentication manager, etc. to use the sound device to generate the authentication sound. The user may generate the authentication sound by sliding, scraping, moving etc. one or more texture protrusions of the sound device against a surface, e.g., the edge of the phone, the user's fingernail, another card, the edge of a table, etc. The one or more texture protrusions may be on the surface, edge, etc. of the sound device. The authentication system may capture the sound of the one or more texture protrusions rubbing against the surface (the real-time sound data) via the audio connection and compare the generated sound to a pre-determined sound configuration. The pre-determined sound configuration may be a user-specific sound generated using the one or more texture protrusions.

The real-time sound data may be analyzed for one or more artifacts, e.g., background noise, sound interference, etc. A machine learning model may be used to determine the presence of the one or more artifacts. If one or more artifacts are determined present in the real-time sound data, the user may be requested to repeat the generation of the real-time sound data. If no artifacts, a low amount of artifacts, or non-relevant artifacts are determined present in the real-time sound data, the real-time sound data may be analyzed to determine a match value.

The real-time sound data and the pre-determined sound configuration may be compared to determine a match value, e.g., match, no match, inconclusive, etc. A machine learning model may be used to determine the match value. The match value may be determined based on a match threshold. If the match value is determined to be equal to or above the match threshold, a notification of the determined match value and/or the authentication completion may be caused to be output. If the match value is determined to be less than the match threshold, the user may be requested to repeat the generation of the real-time sound data or and/or authentication may be rejected. The degree to which the match value exceeds or falls below the match threshold may be considered, e.g., in determining an "inconclusive" match value.

While the examples above involve authenticating in a low technology, militarized zone, it should be understood that techniques according to this disclosure may be adapted to any suitable environment (e.g., high-technology areas, etc.). It should also be understood that the examples above are illustrative only. The techniques and technologies of this disclosure may be adapted to any suitable activity. Presented below are various systems and methods of generating a dynamic virtual representation of an event or an object.

Figure 1:
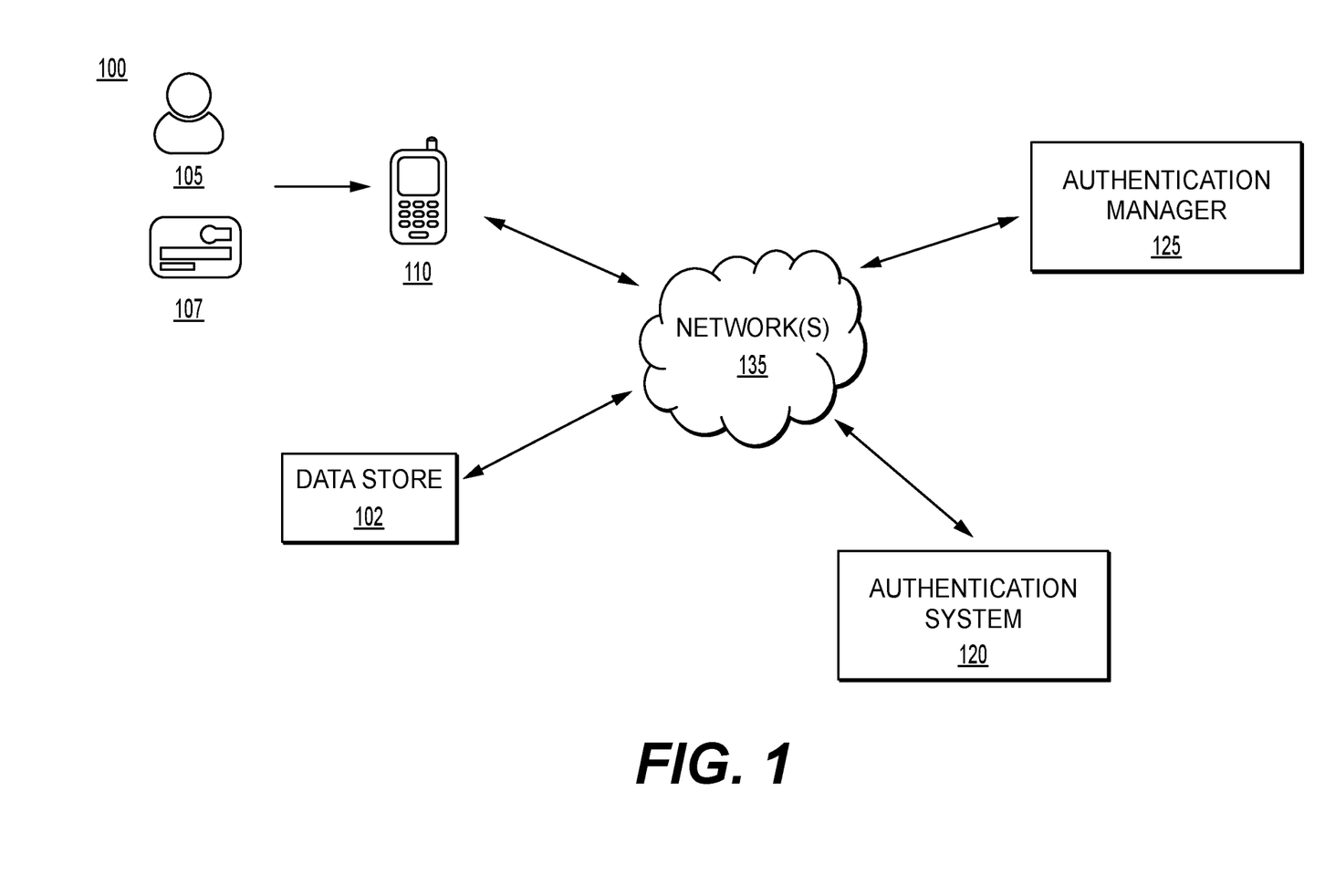
FIG. 1 depicts an exemplary system for authenticating a user identity using a sound device, according to one or more embodiments.

FIG. 1 depicts an exemplary environment 100 for authenticating a user identity using a sound device, according to one or more embodiments. Environment 100 of FIG. 1 depicts a data store 102, a user 105, a sound device 107, a user device 110, an authentication system 120, and a user associated with the authentication system (hereinafter "authentication manager") 125, which may each communicate over a network 135, etc. User 105 may be an individual seeking authentication using sound device 107.

Data store 102 may be configured to store data, such as initial authentication data, real-time sound data, one or more pre-determined sound configurations, a match value threshold, a match value, artifact data, etc.

Initial authentication data may include data for setting up an authentication system, e.g., one or more aspects of authentication system 120, and/or initial authentication of a user (e.g., during use of the set-up authentication system 120). Initial authentication data may include a user's name, address, phone number, current location, one or more comparison values, user-specific knowledge data, etc.

The one or more comparison values may be user-specific and may include ground truth, e.g., one or more expected answers to one or more authentication questions. For example, the one or more comparison values may include expected answers to one or more authentication questions about the street the user 105 grew up on, the maiden name of user 105, the middle name(s) of the parent(s) of user 105, and the like. The one or more comparison values may be obtained in an initialization stage, e.g., prior to application and/or use of the techniques described herein. The user-specific knowledge data may include the real-time data obtained from user 105 in response to the one or more authentication questions. The user-specific knowledge data may be compared to the one or more comparison values. For example, as described in more detail below, if user 105 answers an authentication question about the state they grew up in with "Missouri" and the comparison value is "Kansas," the user-specific knowledge data may be determined to not match the comparison value. The user-specific knowledge data may be obtained during one or both of an initialization stage, e.g., prior to application and/or use of the techniques described herein, or an implementation stage, e.g., via application and/or use of the techniques described herein.

The real-time sound data may be the audio collected via an audio connection by moving sound device 107 against one or more sound activating devices (discussed in more detail below), e.g., in response to an instruction to generate real-time sound data. The one or more pre-determined sound configurations may be pre-determined sound data for sound device 107, e.g., ground truth data for one or more sound regions of sound device 107. The real-time sound data may be stored in data store 102.

The match value threshold may be the threshold at which the real-time sound data is determined to be indicative of a match (e.g., exact match, similar match, etc.) to the pre-determined configuration. The match between the real-time sound data and the pre-determined configuration may not be exact; in some techniques, the threshold may be defined by a percent similarity, e.g., 51%, 60%, 75%, 90%, etc., a range of acceptable match, or the like. The match value may be a determination of whether the comparison between the real-time sound data and the pre-determined configuration is indicative of a match.

The artifact data may be audio collected contemporaneously with the real-time sound data. Artifact data may include the type of artifact collected, e.g., background noise, audio and/or video noise markers, etc.

Sound device 107 may be configured for generating real-time sound data. Sound device 107 may be any device and/or object capable of generating the real-time sound data, e.g., a card (e.g., a bank, credit, gift, account, membership, access, etc. card), such that a sound is generated when the sound device 107 is moved against a surface. Sound device 107 may include one or more planar surfaces 205 and one or more edges 207 (see FIGS. 2A-2C). Sound device 107 may include one or more sound-generating regions (hereinafter "sound regions") on one or both of the one or more planar surfaces 205 and/or the one or more edges 207. The one or more sound regions may be configured linearly on the one or more edges 207.

Figure 2A:
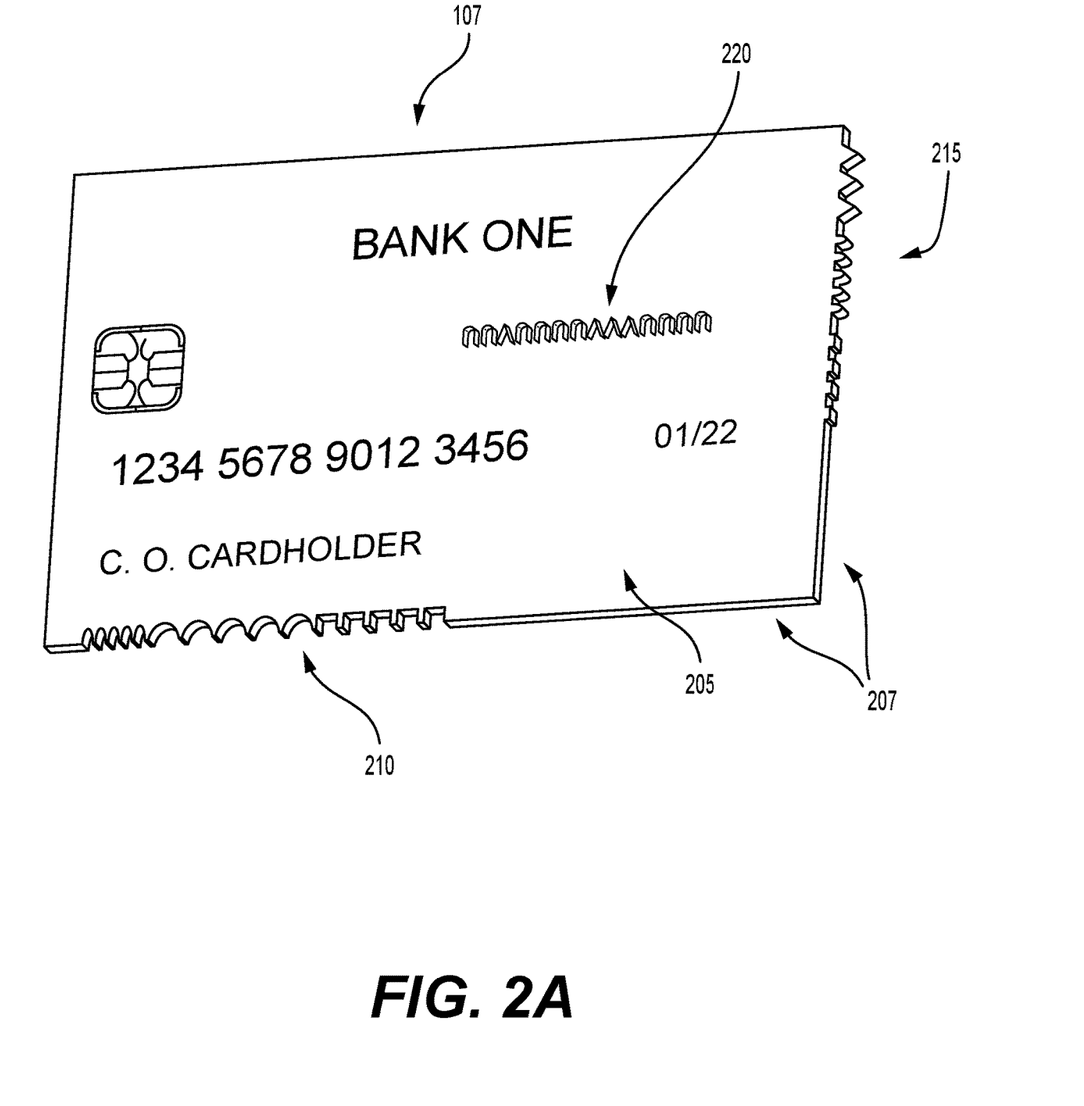
FIGS. 2A-2B depict exemplary sound devices, according to one or more embodiments.
Figure 2B:
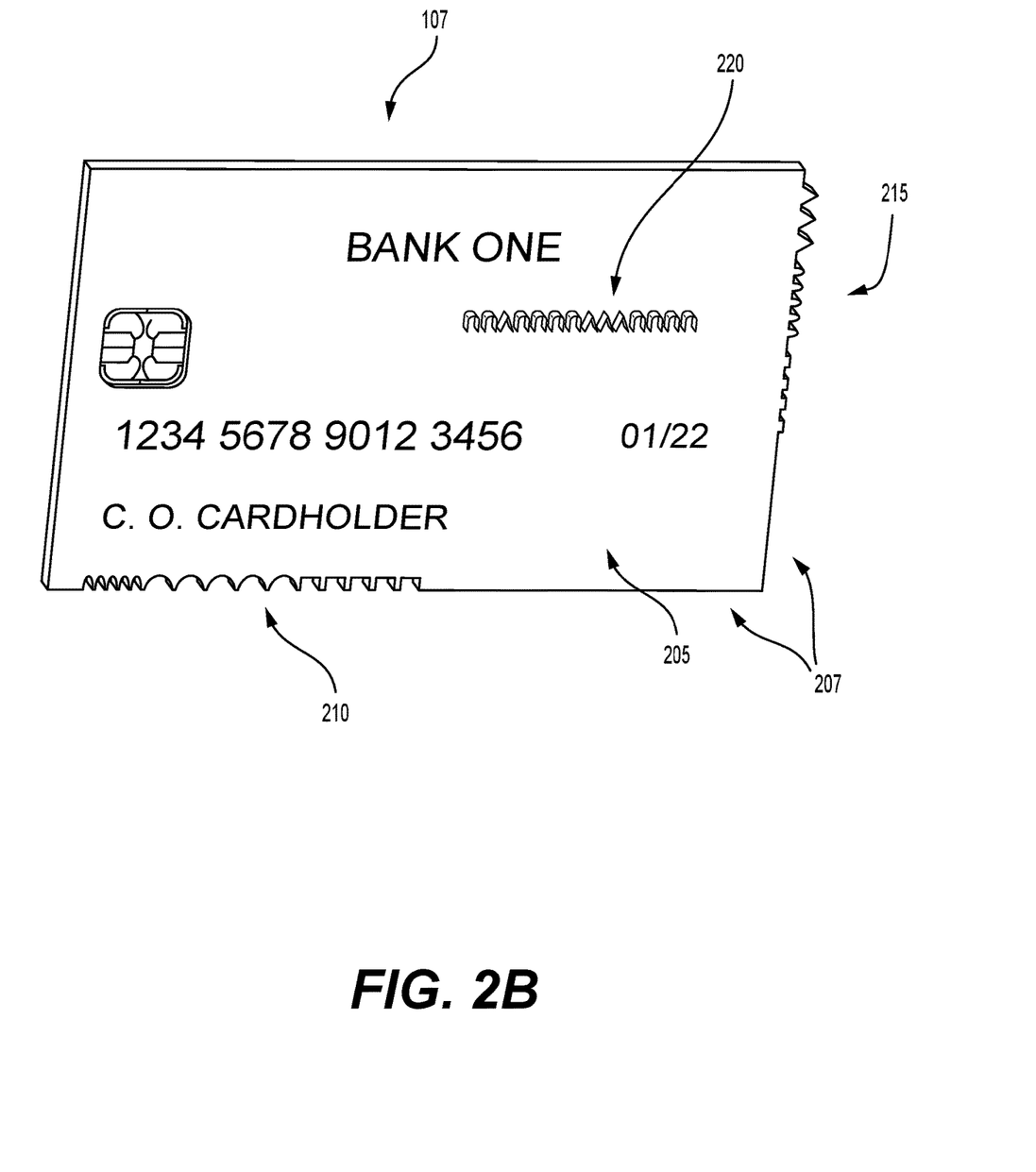
Figure 2C:
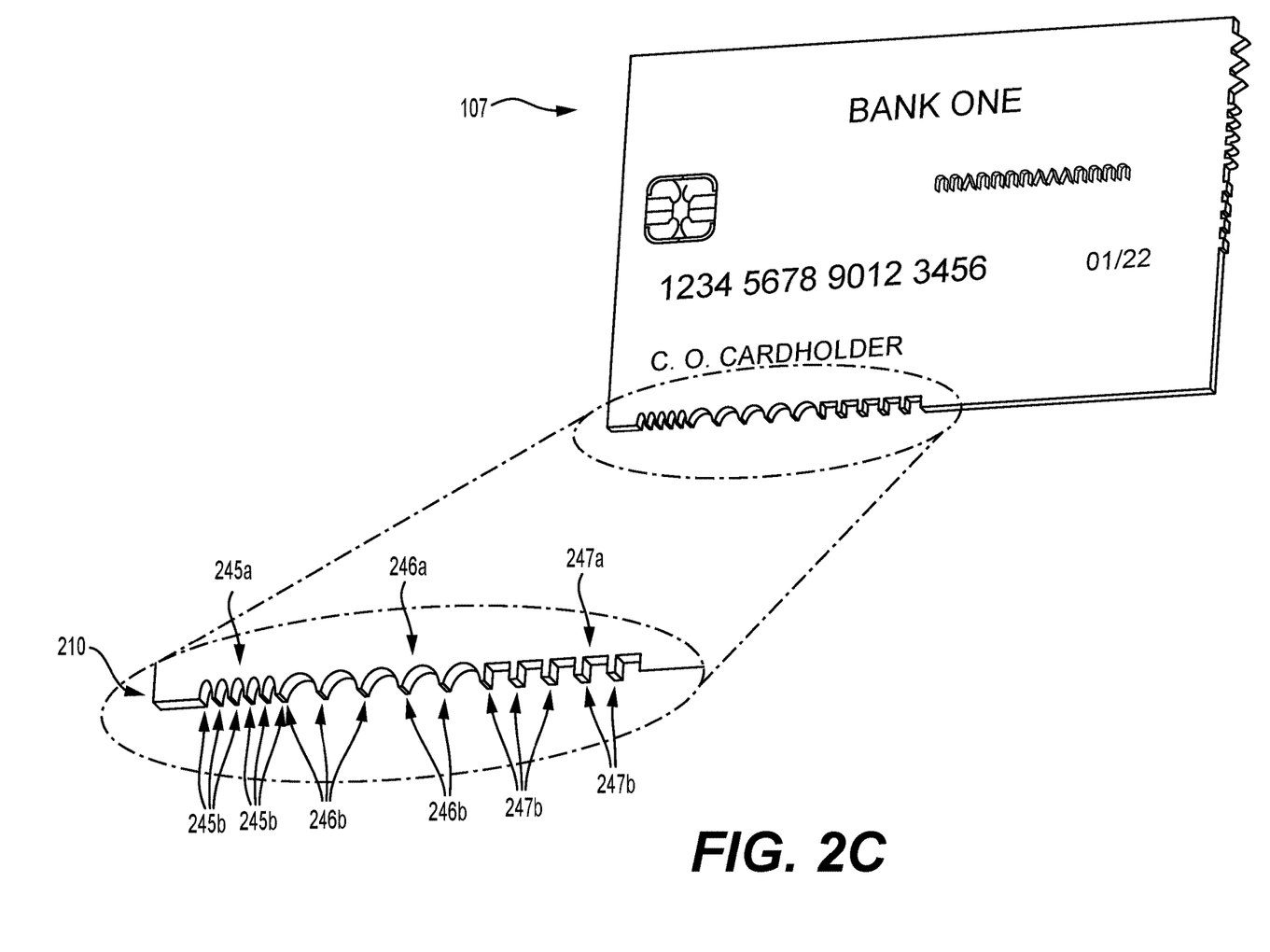
FIG. 2C depicts exemplary texture patterns for a sound device, according to one or more embodiments.

The sound region may be any surface of suitable hardness (e.g., a table, a card, a user appendage (e.g., a fingernail), a phone (e.g., user device 110), a coin, another solid surface, etc.) against which the sound device 107 is moved to generate a sound. Turning now to FIGS. 2A-2B depicting an exemplary sound device 107, sound device 107 may have a first sound region 210, a second sound region 215, and/or a third sound region 220. Each of first sound region 210, second sound region 215, and/or third sound region 220 may include a plurality of texture protrusions. For example, as depicted in FIG. 2C, first sound region 210 may include a first texture pattern 245a, a second texture pattern 246a, a third texture pattern 247a, etc. Each of first texture pattern 245a, second texture pattern 246a, and third texture pattern 247a may have a plurality of texture protrusions 245b, 246b, and 247b, respectively. The various combinations of texture protrusions and/or texture patterns may enable the creation of unique sounds for each sound region. For example, first sound region 210 may generate a different sound than second sound region 215. It should be noted that while three texture patterns are depicted in FIG. 2C for sound region 210, any number of texture patterns and/or texture protrusions may be included in any sound region of sound device 107. For example, in some examples a first sound region 210 may include three texture patterns, while another sound region may include one, two, four or more texture patterns. Also, while three sound regions (e.g., sound region 210, 215, 220) are depicted, in other embodiments, more or less sound regions may be included in a single sound device 107.

Sound device 107 may be composed of any material, e.g., plastic, metal, combinations thereof, etc. The sound region, texture patterns, texture protrusions, etc. may be manufactured in any suitable manner, e.g., by cutting, etching, etc.

Returning to FIG. 1, user device 110 may be configured to connect, e.g., via an audio connection, user 105 with authentication system 120, authentication manager 125 (via a telephone associated with authentication manager 125), etc. User device 110 may be any suitable device, e.g., a cell phone, a payphone, a virtual phone, etc. User device 110 may be configured to obtain data from one or more aspects of environment 100, e.g., from data store 102, authentication system 120, authentication manager 125 (e.g., via a user device), etc. User device 110 may be configured to transmit data to one or more aspects of environment 100, e.g., to data store 102, authentication system 120, authentication manager 125 (e.g., via a user device), etc. In some techniques, user device 110 may be a sound activating device. For example, user 105 may move sound device 107 against user device 110 (e.g., against an edge of user device 110) to generate the real-time sound data.

Authentication system 120 may include one or more algorithms, models, or the like for parsing and/or analyzing real-time sound data to determine the presence of one or more artifacts and/or authenticate a user identity. Authentication system 120 may be configured to determine the presence of one or more artifacts in real-time sound data. Authentication system 120 may be configured to determine the presence of one or more artifacts in real-time sound data using a trained machine learning model, e.g., a trained artifact machine learning model. Authentication system 120 may be configured to authenticate a user identity by determining the match value between the real-time sound data and the pre-determined sound configuration. Authentication system 120 may be configured to authenticate a user identity by determining the match value using a trained machine learning model, e.g., a trained sound match machine learning model. An exemplary method for determining the presence of one or more artifacts and/or authenticating a user identity is described in further detail below.

Authentication system 120 may be configured to obtain data from one or more aspects of environment 100, e.g., from data store 102, user device 110, authorization manager 125, etc. Authentication system 120 may be configured to transmit data to one or more aspects of environment 100, e.g., to data store 102, user device 110, authorization manager 125, etc.

As discussed in further detail below, authentication system 120 may one or more of generate, store, train, and/or use a machine learning model configured to determine the presence of one or more artifacts and/or authenticate a user identity. Authentication system 120 may include a machine learning model and/or instructions associated with the machine learning model, e.g., instructions for generating a machine learning model, training the machine learning model, using the machine learning model etc. Authentication system 120 may include instructions for retrieving real-time sound data and/or a pre-determined sound configuration, adjusting one or more match value data, e.g., based on the output of the machine learning model, and/or operating a GUI, e.g., a GUI associated with user device 110, to output one or more artifact data and/or match value data, e.g., as adjusted based on the machine learning model. Authentication system 120 may include training data, e.g., training passive real-time sound data, training pre-determined sound configuration(s), training match value data, training outcome data (e.g., authentication or no authentication), and may include ground truth (e.g., match or no match data). The machine learning model of authentication system 120 may be trained to determine whether user 105 is requesting authentication, or if an illegitimate actor is improperly attempting to authenticate based on at least the artifact data, match value data, and/or outcome data. For example, while user 105 may correctly answer the one or more authentication questions, one or more artifacts detected in the real-time sound data may prevent authentication.

In some embodiments, a system or device other than authentication system 120 is used to generate and/or train the machine learning model. For example, such a system may include instructions for generating the machine learning model, the training data and ground truth, and/or instructions for training the machine learning model. A resulting trained machine learning model may then be provided to authentication system 120.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between the training data and the ground truth data, such that the trained machine learning model is configured to determine the presence of one or more artifacts and/or authenticate a user identity based on the learned associations.

In various embodiments, the variables of a machine learning model may be interrelated in any suitable arrangement in order to generate the output. For example, the machine learning model may include one or more convolutional neural network (CNN) configured to identify features in the real-time sound data, and may include further architecture, e.g., a connected layer, neural network, etc., configured to determine a relationship between the identified features in order to determine one or more user preferences.

In some instances, different samples of training data and/or input data may not be independent. Thus, in some embodiments, the machine learning model may be configured to account for and/or determine relationships between multiple samples. For example, in some embodiments, the machine learning model of authentication system 120 may include a Recurrent Neural Network (RNN). Generally, RNNs are a class of feed-forward neural networks that may be well adapted to processing a sequence of inputs. In some embodiments, the machine learning model may include a Long Short Term Memory (LSTM) model and/or Sequence-to-Sequence (Seq2Seq) model.

As discussed herein, authentication manager 125 may be an individual and/or system facilitating the authentication, e.g., via authentication system 120. For example, authentication manager 125 may communicate with user 105, e.g., via user device 110, to provide the one or more authentication questions and/or request user 105 provide the real-time sound data. In some techniques, authentication manager 125 may be automated.

One or more of the components in FIG. 1 may communicate with each other and/or other systems, e.g., across network 135. In some embodiments, network 135 may connect one or more components of environment 100 via a wired connection, e.g., a USB connection between authentication system 120 and data store 102. In some embodiments, network 135 may connect one or more aspects of environment 100 via an electronic network connection, for example a wide area network (WAN), a local area network (LAN), personal area network (PAN), or the like. In some embodiments, the electronic network connection includes the internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network may obtain information from any other computer and communicate with parties of other computers or devices. The most widely used part of the Internet is the World Wide Web (often-abbreviated "WWW" or called "the Web"). A "website page," a "portal," or the like generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. In any case, the connections within the environment 100 may be network, wired, any other suitable connection, or any combination thereof.

Although depicted as separate components in FIG. 1, it should be understood that a component or portion of a component in the environment 100 may, in some embodiments, be integrated with or incorporated into one or more other components. For example, data store 102 may be integrated into authentication system 120 or the like. In some embodiments, operations or aspects of one or more of the components discussed above may be distributed amongst one or more other components. Any suitable arrangement and/or integration of the various systems and devices of the environment 100 may be used.

Figure 3A:
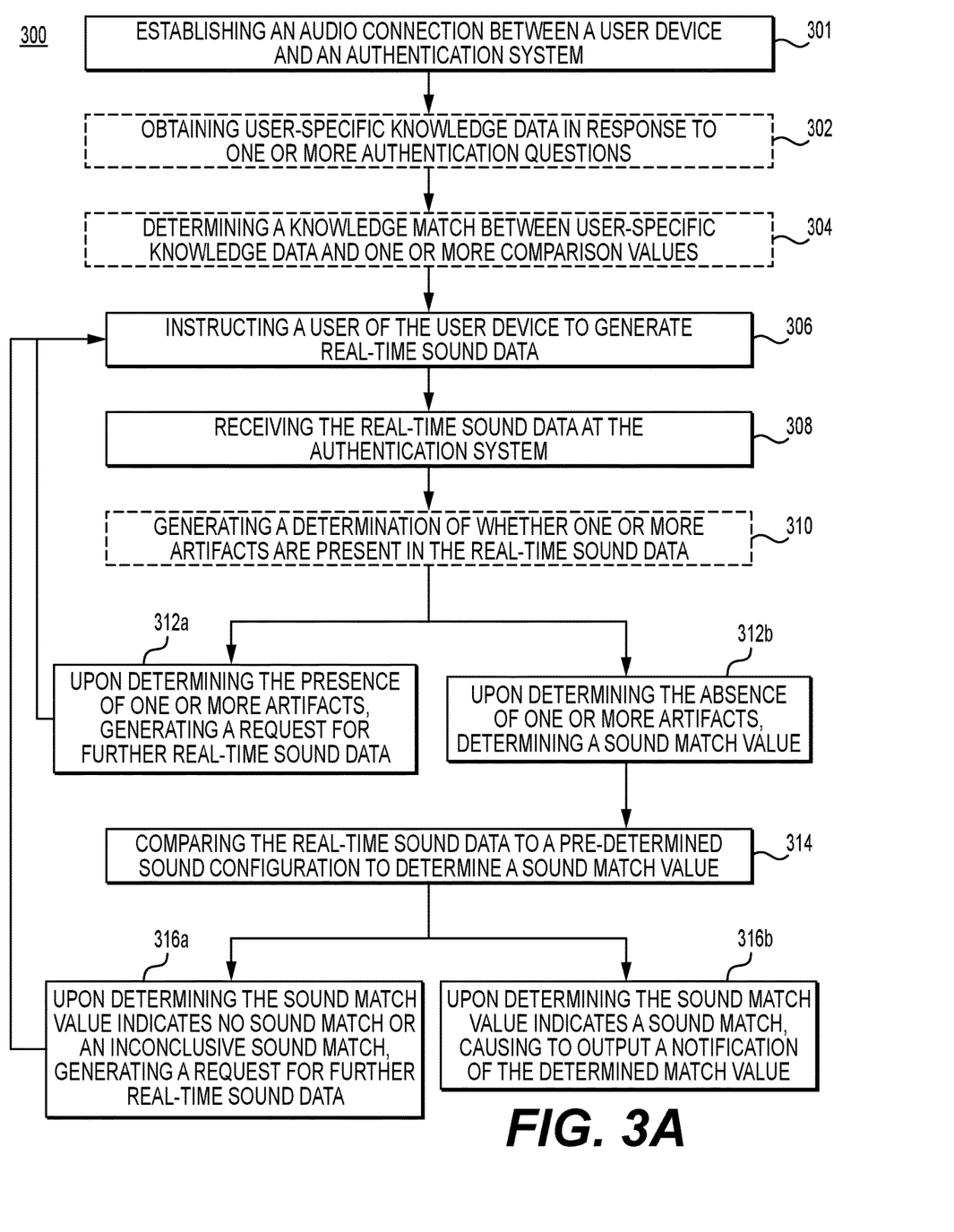
FIG. 3A depicts an exemplary method for authenticating a user identity using a sound device, according to one or more embodiments.

FIG. 3A depicts an exemplary method 300 for authenticating a user identity using a sound device, according to one or more embodiments. At step 301, an audio connection between a user device and an authentication system may be established. For example, user 105 may call a phone number associated with authentication system 120, which may establish a connection between two or more of user device 110, authentication system 120, and/or authentication manager 125. In some techniques, the audio connection may be established after determination of a match between user-specific knowledge data and the one or more comparison values. For example, steps 302 and/or 304 may occur prior to step 301 and/or via one or more of text messaging, emailing, etc.

Optionally, at step 302, initial authentication data may be obtained, e.g., via authentication system 120. In some techniques, the obtained initial authentication data may be used to initialize the system. For example, user 105 may provide one or more comparison values (e.g., ground truth to one or more authentication questions). In some techniques, the obtained initial authentication data may be used to determine a user-specific knowledge match (as discussed in step 304). For example, user 105 may be asked one or more authentication questions (e.g., audibly by authentication manager 125, by message via user device 110, etc.) and may provide answers to the one or more authentication questions (e.g., user-specific knowledge data) (e.g., audibly to authentication manager 125, by message via user device 110, etc.).

Optionally, at step 304, the user-specific knowledge data and one or more comparison values may be analyzed to determine a user-specific knowledge match (hereinafter "knowledge match"). As discussed above, the one or more comparison values may include ground truth, e.g., correct answers, to the one or more authentication questions. For example, if user 105 answered an authentication question about their favorite color with "blue," the answer "blue" may be compared to the comparison value associated with the authentication question. If the comparison value is "blue," the user-specific knowledge data may be determined to match the comparison value and user 105 may be instructed to generate real-time sound data (see step 306). If the comparison value is "red," the user-specific knowledge data may be determined not to match the comparison value. If no match is determined between the user-specific knowledge data and the one or more comparison values, user 105 may be asked to provide further user-specific knowledge and/or authentication may be determined to have failed. In some techniques, this process may be repeated until a match is determined and/or a pre-set number of times that a match has failed to be determined (e.g., one, two, three, etc. times) occurs. For example, if a match fails to be determined between the user-specific knowledge data and the one or more comparison values two times in a row, authentication may be considered failed.

At step 306, a user of the user device 110, e.g., user 105, may be instructed to generate real-time sound data, e.g., by authentication system 120, authentication manager 125, etc. In some techniques, user 105 may be instructed to generate real-time sound data after a determination that a knowledge match exists (see step 304). The real-time sound data may be collected using one or more microphones associated with user device 110.

Figure 3B:
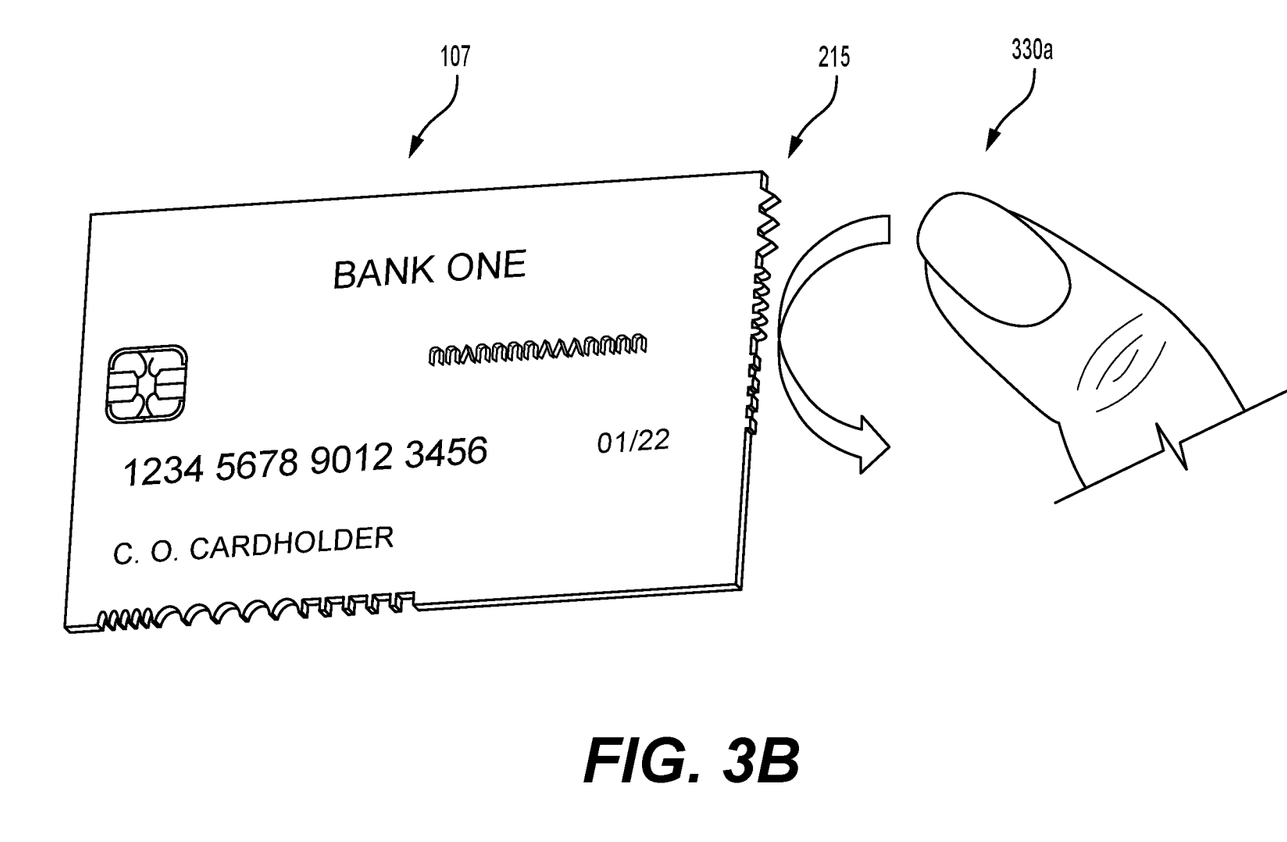
FIGS. 3B-3C depict exemplary schematics for authenticating a user identity using a sound device, according to one or more embodiments.
Figure 3C:
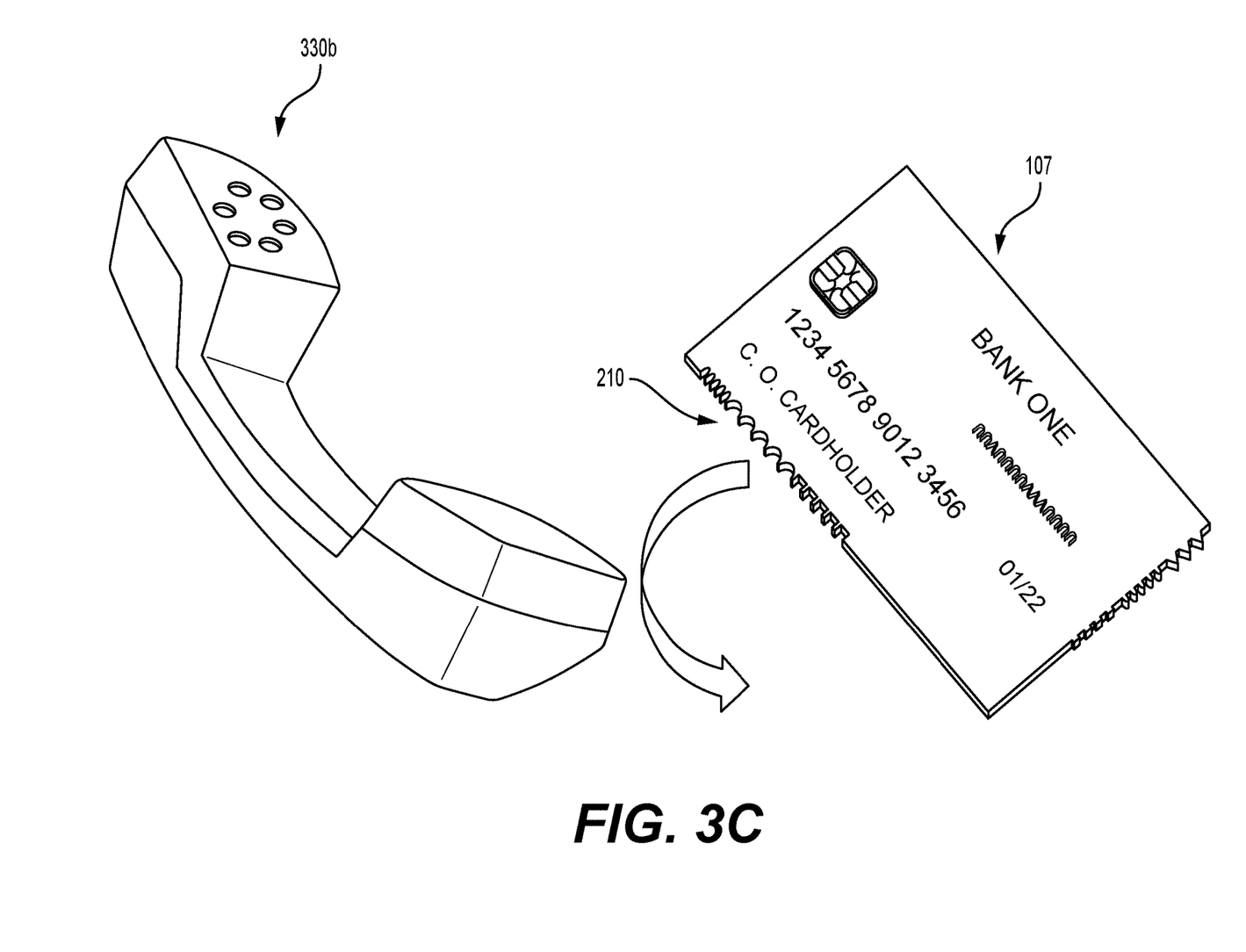

User 105 may generate real-time sound data using one or more sound activating devices (e.g., user device 110, a fingernail of user 105, etc.) and sound device 107. FIGS. 3B and 3C depict exemplary schematics for generating real-time sound data using one or more exemplary sound activating devices. Any suitable sound activating device (e.g., a surface) may be used to generate real-time sound data. For example, as depicted in FIG. 3B, a fingernail of user 105 (hereinafter "fingernail") 330a may interact directly, e.g., be dragged across, second sound region 215 to generate real-time sound data associated with second sound region 215. In another example, as depicted in FIG. 3C, first sound region 210 may be dragged across a telephone receiver 330b to generate real-time sound data associated with first sound region 210. At step 308, the real-time sound data may be obtained by the authentication system 120.

At step 310, optionally, a determination of whether one or more artifacts are present in the real-time sound data may be generated. The real-time sound data may be analyzed, e.g., by authentication system 120, to determine the presence of one or more artifacts, e.g., background noise, audio and/or video noise markers, etc. For example, pre-recorded audio may be distorted because of low-quality microphones, poor microphone placement, etc. when the audio was recorded. Thus, if pre-recorded audio of the sound device being dragged against a sound activating device is played when real-time sound data is collected (see step 306), the distortions from the recording may be detected as artifacts.

In some techniques, generating a determination of whether one or more artifacts are present in real-time sound data may include determinations of the amount of artifacts. For example, determining one or more artifacts are not present may include determining no artifacts are present in the real-time sound data, a low amount of artifacts are present in the real-time sound data, the artifacts present in the sound data are not relevant to authentication (e.g., background noise), or the like. In another example, determining that one or more artifacts are present may include determining whether a large number of artifacts are present, the artifacts present in the sound data are relevant to authentication (e.g., audio and/or video noise markers), or the like.

In some techniques, the type of artifact collected may be determined. Certain types of artifacts may be determined to be more relevant to authentication than other types of artifacts. For example, background noise may be characterized as a lesser risk to authentication than audio and/or video noise markers. Thus, if background noise is the sole artifact detected in real-time sound data, authentication may proceed to determining a match value (see step 312b). In another example, audio and/or video noise markers may be characterized as a greater risk to authentication than background noise. Thus, if audio and/or video noise markers are detected in real-time sound data, authentication may be rejected and/or a request for further real-time sound data may be generated (see step 312a).

The parameters defining whether one or more artifacts are determined to be present or not present and/or the weight of the types of artifacts may be customized. For example, User A may determine background noise, audio noise markers, and video noise markers are highly relevant to authentication, and if any are detected, authentication is rejected. In another example, User B may determine background noise and video noise markers are highly relevant to authentication, and audio noise markers are not highly relevant to authentication. Thus, under User B's customized parameters, upon detection of background noise and/or video noise markers, authentication may be rejected and/or a request for further real-time sound data may be generated (see step 312a), and/or upon detection of audio noise markers, a match value may be determined (see step 312b).

In some techniques, the determination of whether one or more artifacts are present in the real-time sound data may be done by a trained machine learning model, e.g., the trained artifact machine learning model. The trained artifact machine learning model may be trained by receiving artifact training data and training a machine learning model to infer the presence of one or more artifacts. The artifact training data includes types of artifacts, real-time sound data with artifacts, real-time sound data without artifacts, etc.

At step 314, the real-time sound data may be compared to a pre-determined sound configuration to determine a match value. In some techniques, the real-time sound data may be compared to the pre-determined sound configuration to determine a percent similarity, e.g., 51%, 60%, 75%, 90%, etc. The determined percent similarity may be compared to the match threshold. For example, if the threshold for authentication is 80% and the determined percent similarity is 70%, the match value may indicate no sound match and authentication may be determined to have failed (see step 316a).

In some techniques, an inconclusive result may be determined. An inconclusive result may be determined if the similarity is within an uncertainty range, e.g., 1%, 2%, 3%, 4%, 5%, 6%, 7%, 8%, 9%, etc. above or below the match threshold. For example, if the threshold for authentication is 80% and the determined percent similarity is 79%, the match value may be inconclusive with a 1% uncertainty range. In another example, if the threshold for authentication is 80% and the determined percent similarity is 84%, the match value may be inconclusive with a 5% uncertainty range.

As depicted by step 316a, authentication may be determined to have failed upon a determination that the match value indicates "no match" or "inconclusive." Additionally or alternatively, a request for further real-time sound data may be generated automatically upon a determination that the match value indicates "no match" or "inconclusive." In some techniques, the request for further real-time sound data may not be generated, e.g., if the determined similarity (as discussed above) falls below the match threshold by a refusal range, e.g., 5%, 10%, 11%, 12%, 13%, 14%, 15%, 16%, 17%, 18%, 19%, 20%, 25%, 30%, 40%, etc. below the match threshold. For example, if a determined "no match" or "inconclusive match" falls below the threshold for authentication by 12%, the request for further real-time sound data may not be generated if the refusal range is 12%. In another example, if a determined "no match" or "inconclusive match" falls below the threshold for authentication by 5%, the request for further real-time sound data may not be generated if the refusal range is 5%.

As depicted in step 316b, a notification of the determined match value may be output if the sound match value indicates a sound match. For example, if the threshold for authentication is 95% and the determined percent similarity is 97%, the match value may indicate a sound match and authentication may be determined to have been successful (see step 316b). The match threshold may be customized by a user such that a higher match threshold may result in increased authentication strength. As depicted by step 316b, the system hosting the authentication system may cause to output a notification of the determined match value (e.g., a determined match value of "match").

In some techniques, a trained machine learning model, e.g., a trained sound match machine learning model, may be used to determine the match value. The trained sound match machine learning model is trained by receiving sound match training data and training a machine learning model to infer the match value. The sound match training data includes a plurality of pre-determined sound configurations, a plurality of match values, etc.

The system hosting the authentication system may cause to output a notification of the determined match value (e.g., "match," "no match," "inconclusive," etc.) to a recipient system, e.g., to a GUI associated with user device 110, to a GUI of a user device associated with authentication manager 125, etc. In some techniques, the authentication system 120 and/or the authentication manager 125 may audibly output the notification of the determined match value (e.g., verbalize the determined match value via the telephone line).

One or more implementations disclosed herein include and/or are implemented using a machine learning model, e.g., authentication system 120, are implemented using a machine learning model and/or are used to train the machine learning model. A given machine learning model may be trained using the training flow chart 400 of FIG. 4. The training data 412 may include one or more of stage inputs 414 and the known outcomes 418 related to the machine learning model to be trained. The stage inputs 414 are from any applicable source including text, visual representations, data, values, comparisons, and stage outputs, e.g., one or more outputs from one or more steps from FIGS. 3A-3C. The known outcomes 418 are included for the machine learning models generated based on supervised or semi-supervised training. An unsupervised machine learning model is not trained using the known outcomes 418. The known outcomes 418 includes known or desired outputs for future inputs similar to or in the same category as the stage inputs 414 that do not have corresponding known outputs.

Figure 4:
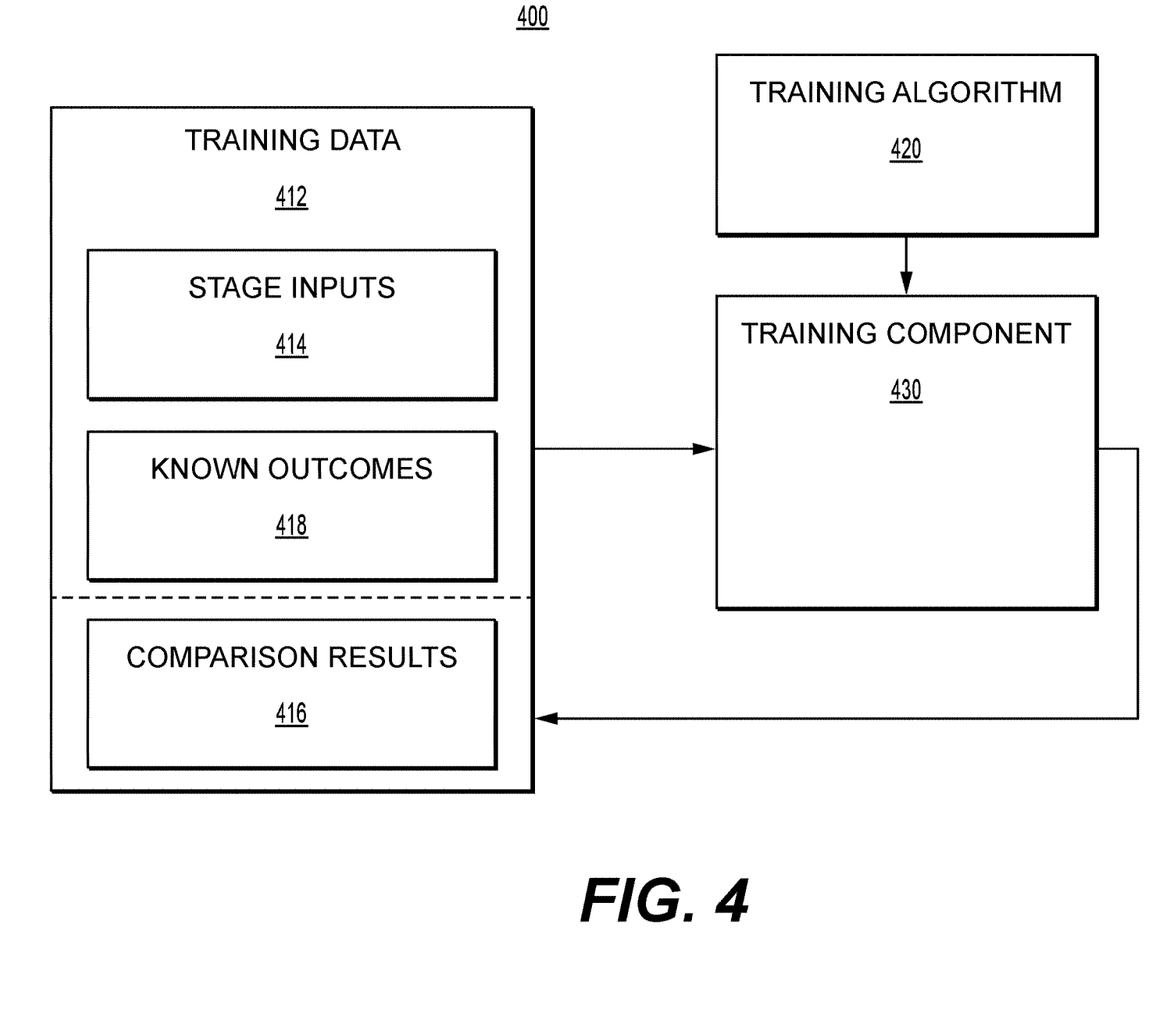
FIG. 4 depicts an example machine learning training flow chart, according to one or more embodiments.

The training data 412 and a training algorithm 420, e.g., one or more of the modules implemented using the machine learning model and/or are used to train the machine learning model, is provided to a training component 430 that applies the training data 412 to the training algorithm 420 to generate the machine learning model. According to an implementation, the training component 430 is provided with comparison results 416 that compare a previous output of the corresponding machine learning model to apply the previous result to re-train the machine learning model. The comparison results 416 are used by the training component 430 to update the corresponding machine learning model. The training algorithm 420 utilizes machine learning networks and/or models including, but not limited to a deep learning network such as a transformer, Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

Figure 5:
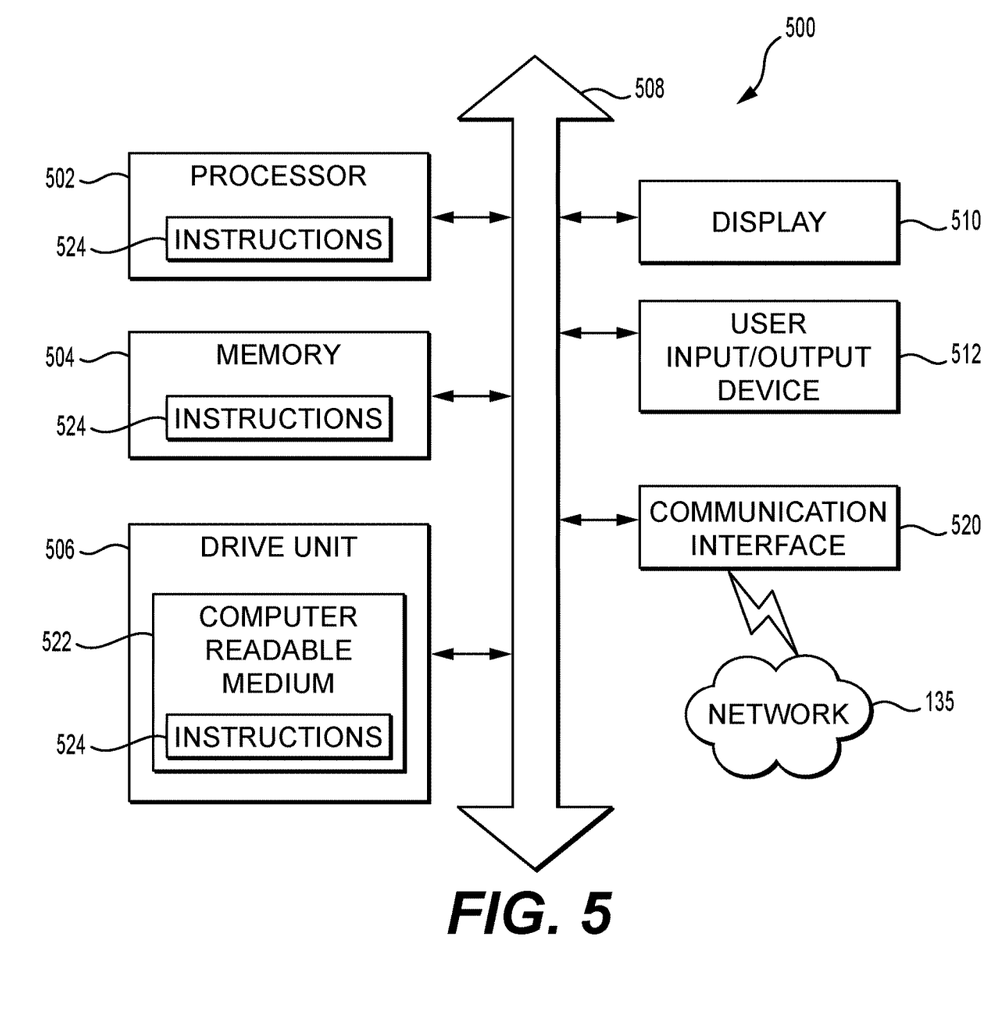
FIG. 5 depicts a simplified functional block diagram of a computer, according to one or more embodiments.

FIG. 5 depicts a simplified functional block diagram of a computer 500 that may be configured as a device for executing the methods disclosed here, according to exemplary embodiments of the present disclosure. For example, the computer 500 may be configured as a system according to exemplary embodiments of this disclosure. In various embodiments, any of the systems herein may be a computer 500 including, for example, a data communication interface 520 for packet data communication. The computer 500 also may include a central processing unit (CPU) 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for authenticating a user identity using a sound device, the sound device comprising a card including a plurality of texture protrusions, the method comprising:
   establishing an audio connection between a user device and an authentication system;
   instructing a user of the user device to generate real-time sound data, wherein the real-time sound data is generated by the plurality of texture protrusions of contacting a sound activating device;
   receiving, via the user device, the real-time sound data at the authentication system;
   comparing, via the authentication system, the real-time sound data to a pre-determined sound configuration to determine a match value, wherein the match value is one of match or no match; and upon determining the match value, causing to output a notification of the determined match value.

2. The method of claim 1, wherein the plurality of texture protrusions are configured linearly along one or more edges of the card.

3. The method of claim 1, wherein the card comprises two planar surfaces and the plurality of texture protrusions are configured on one of the two planar surfaces.

4. The method of claim 1, wherein the generating real-time sound data further comprises:
moving the sound device against the sound activating device such that the plurality of texture protrusions of the sound device interact with the sound activating device.

5. The method of claim 1, wherein the sound activating device includes one or more of the user device, a user appendage, a coin, or a solid surface.

6. The method of claim 1, further comprising:
receiving, via the authentication system, initial authentication data of a user, the initial authentication data including user-specific knowledge data;
comparing, via one or more processors, the user-specific knowledge data to one or more comparison values to determine a user-specific knowledge match; and
upon determining the user-specific knowledge match between the user-specific knowledge data and the one or more comparison values, establishing the audio connection with the authentication system between the user device and the authentication system.

7. The method of claim 1, further comprising:
analyzing, via the authentication system, the real-time sound data for one or more artifacts;
generating, via the authentication system, a determination of whether one or more artifacts are present in the real-time sound data; and
causing to output, via a user interface, the determination of whether one or more artifacts are present in the real-time sound data.

8. The method of claim 7, further comprising:
upon generating a determination that one or more artifacts are present in the real-time sound data, causing to output via a user interface a request for further real-time sound data.

9. The method of claim 1, further comprising:
upon determining the match value indicates no match, requesting further real-time sound data.

10. A system, the system comprising:
at least one memory storing instructions; and
at least one processor executing the instructions to perform operations for authenticating a user identity using a sound device, the sound device comprising a card including a plurality of texture protrusions, the operations including:
establishing an audio connection between a user device and an authentication system;
instructing a user of the user device to generate real-time sound data, wherein the real-time sound data is generated by the sound device contacting a sound activating device;
receiving, via the user device, the real-time sound data at the authentication system;
comparing, via the authentication system, the real-time sound data to a pre-determined sound configuration to determine a match value, wherein the match value is one of match or no match; and
upon determining the match value, causing to output, a notification of the determined match value.

11. The system of claim 10, wherein the plurality of texture protrusions are configured linearly along one or more edges of the card.

12. The system of claim 10, wherein the card comprises two planar surfaces and the plurality of texture protrusions are configured on one of the two planar surfaces.

13. The system of claim 10, wherein the generating real-time sound data further comprises:
moving the sound device against the sound activating device such that the plurality of texture protrusions of the sound device interact directly with the sound activating device.

14. The system of claim 10, wherein the sound activating device includes one or more of the user device, a user appendage, a coin, or a solid surface.

15. The system of claim 10, further comprising:
requesting, via the user device, initial authentication data, the initial authentication data including user-specific knowledge data;
receiving, via the user device, the user-specific knowledge data;
comparing, via one or more processors, the user-specific knowledge data to one or more comparison values to determine a user-specific knowledge match; and
upon determining a match between the user-specific knowledge data and the one or more comparison values, establishing the audio connection with the authentication system.

16. The system of claim 10, further comprising:
analyzing, via the authentication system, the real-time sound data for one or more artifacts;
generating, via the authentication system, a determination of whether one or more artifacts are present in the real-time sound data; and
causing to output, via a user interface, the determination of whether one or more artifacts are present in the real-time sound data.

17. The system of claim 16, further comprising:
upon generating a determination that one or more artifacts are present in the real-time sound data, causing to output via a user interface a request for further real-time sound data.

18. The system of claim 10, further comprising:
upon determining the match value indicates no match, requesting further real-time sound data.

19. A method for authenticating a user identity using a sound device, the sound device comprising a card including a plurality of texture protrusions, the method comprising:
receiving, via an authentication system, initial authentication data of a user, the initial authentication data including user-specific knowledge data;
comparing, via one or more processors, the user-specific knowledge data to one or more comparison values to determine a user-specific knowledge match;
upon determining the user-specific knowledge match between the user-specific knowledge data and the one or more comparison values, establishing an audio connection between a user device and the authentication system;
instructing a user of the user device to generate real-time sound data, wherein the real-time sound data is generated by the sound device contacting a sound activating device;
receiving, via the user device, the real-time sound data at the authentication system;
comparing, via the authentication system, the real-time sound data to a pre-determined sound configuration to determine a match value, wherein the match value is one of match or no match; and upon determining the match value, causing to output, a notification of the determined match value.

20. The method of claim 19, further comprising:

analyzing, via the authentication system, the real-time sound data for one or more artifacts;

generating, via the authentication system, a determination of whether one or more artifacts are present in the real-time sound data; and causing to output, via a user interface, the determination of whether one or more artifacts are present in the real-time sound data.

* * * * *